US012602881B2

(12) United States Patent
Rho et al.

(10) Patent No.: US 12,602,881 B2
(45) Date of Patent: Apr. 14, 2026

(54) ELECTRONIC DEVICE AND METHOD FOR PROVIDING AUGMENTED REALITY

(71) Applicant: Samsung Electronics Co., Ltd., Suwon-si (KR)

(72) Inventors: Yeonhee Rho, Suwon-si (KR); Wonkyu Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 32 days.

(21) Appl. No.: 18/146,257

(22) Filed: Dec. 23, 2022

(65) Prior Publication Data

US 2023/0128520 A1     Apr. 27, 2023

Related U.S. Application Data

(63) Continuation of application No. PCT/KR2021/007733, filed on Jun. 21, 2021.

(30) Foreign Application Priority Data

Jul. 1, 2020     (KR) ......................... 10-2020-0080848

(51) Int. Cl.
*G06T 19/00*          (2011.01)
*G06F 3/01*           (2006.01)
(Continued)

(52) U.S. Cl.
CPC ............ *G06T 19/006* (2013.01); *G06F 3/013* (2013.01); *G06T 19/20* (2013.01); *G06V 10/761* (2022.01); *G06T 2219/2016* (2013.01)

(58) Field of Classification Search
None
See application file for complete search history.

(56) References Cited

U.S. PATENT DOCUMENTS 8,341,541 B2     12/2012  Holecek et al.
8,745,541 B2 *    6/2014  Wilson .................... G06F 3/038
345/158

(Continued)

FOREIGN PATENT DOCUMENTS

JP        2015-149634 A      8/2015
JP           6518582 B2      5/2019
(Continued)

OTHER PUBLICATIONS

Juha Lehikoinen et al. Accessing Context in Wearable Computers, Personal and Ubiquitous Computing, Springer Verlag, London, GB, vol. 6, No. 1, Jan. 2, 2002, pp. 64-74, XP058201457.

(Continued)

*Primary Examiner* — David H Chu
(74) *Attorney, Agent, or Firm* — Jefferson IP Law, LLP

(57)          ABSTRACT

An augmented reality (AR) device supporting AR is provided. The AR includes a memory in which data about at least one augmented reality element mapped to an AR space is stored, at least one sensor, a display, and a processor, wherein the memory may store instructions to allow the processor, upon execution, to provide, to a user screen through the display, augmented reality in which at least some of the at least one augmented reality element are output to a user's field of view (FOV) region, receive a first input by using the at least one sensor, and in response to the first input, display on the user screen a user interface in which relative positions of the at least one augmented reality element are displayed.

20 Claims, 12 Drawing Sheets

(51) Int. Cl.
G06T 19/20 (2011.01)
G06V 10/74 (2022.01)

(56) References Cited

U.S. PATENT DOCUMENTS

| | | | |
|---|---|---|---|
| 8,972,174 B2 | 3/2015 | Jeung et al. | |
| 9,129,430 B2 | 9/2015 | Salter et al. | |
| 9,201,564 B2 | 12/2015 | Holecek et al. | |
| 9,501,873 B2 | 11/2016 | Salter et al. | |
| 9,710,132 B2 | 7/2017 | Tsukahara et al. | |
| 9,927,948 B2 | 3/2018 | Tsukahara et al. | |
| 10,182,210 B1* | 1/2019 | Goetzinger, Jr. | H04N 7/147 |
| 10,484,673 B2 | 11/2019 | Juin | |
| 10,502,580 B2 | 12/2019 | Choi et al. | |
| 10,540,003 B2 | 1/2020 | Hong et al. | |
| 10,540,009 B2 | 1/2020 | Sudou et al. | |
| 10,620,791 B2 | 4/2020 | Kawamura | |
| 11,036,364 B2 | 6/2021 | Zurmoehle et al. | |
| 11,054,963 B2 | 7/2021 | Han et al. | |
| 11,972,092 B2 | 4/2024 | Zurmoehle et al. | |
| 2005/0245241 A1* | 11/2005 | Durand | H04L 67/75 |
| | | | 455/414.1 |
| 2012/0176410 A1 | 7/2012 | Meier et al. | |
| 2013/0073988 A1 | 3/2013 | Groten et al. | |
| 2013/0159936 A1* | 6/2013 | Yamaguchi | G09G 5/34 |
| | | | 715/850 |
| 2014/0375683 A1* | 12/2014 | Salter | G06F 3/011 |
| | | | 345/633 |
| 2015/0015611 A1 | 1/2015 | Meier et al. | |
| 2015/0070347 A1* | 3/2015 | Hofmann | G06F 3/0346 |
| | | | 345/419 |
| 2015/0228121 A1* | 8/2015 | Tsukahara | G06F 3/04817 |
| | | | 345/419 |
| 2015/0325054 A1 | 11/2015 | Salter et al. | |
| 2015/0358614 A1* | 12/2015 | Jin | G06F 3/03545 |
| | | | 348/49 |
| 2016/0004306 A1* | 1/2016 | Maltz | G02B 27/0172 |
| | | | 345/173 |
| 2016/0054791 A1* | 2/2016 | Mullins | G04G 21/04 |
| | | | 345/173 |
| 2016/0364912 A1 | 12/2016 | Cho et al. | |
| 2017/0069143 A1 | 3/2017 | Salter et al. | |
| 2017/0092002 A1* | 3/2017 | Mullins | G02B 27/0172 |
| 2017/0109936 A1 | 4/2017 | Powderly et al. | |
| 2018/0081520 A1 | 3/2018 | Han et al. | |
| 2018/0095635 A1 | 4/2018 | Valdivia et al. | |
| 2018/0315246 A1 | 11/2018 | Fukazawa et al. | |
| 2018/0321798 A1* | 11/2018 | Kawamura | G06F 3/0481 |
| 2019/0258365 A1 | 8/2019 | Zurmoehle et al. | |
| 2020/0081555 A1 | 3/2020 | Powderly et al. | |
| 2020/0159394 A1* | 5/2020 | Chassen | G06F 16/54 |
| 2020/0242846 A1 | 7/2020 | Meier et al. | |
| 2020/0252741 A1* | 8/2020 | Lyren | H04S 7/40 |
| 2020/0388246 A1* | 12/2020 | Chrapek | G06T 19/006 |
| 2021/0326428 A1* | 10/2021 | Edwards | G06T 19/006 |
| 2022/0075458 A1 | 3/2022 | Powderly et al. | |
| 2023/0188832 A1* | 6/2023 | Xu | H04N 23/632 |
| | | | 348/333.01 |
| 2024/0211113 A1 | 6/2024 | Zurmoehle et al. | |

FOREIGN PATENT DOCUMENTS

| | | | |
|---|---|---|---|
| JP | 6549693 B2 | 7/2019 | |
| JP | 6560974 B2 | 8/2019 | |
| KR | 10-2015-0140043 A | 12/2015 | |
| KR | 10-2016-0023888 A | 3/2016 | |
| KR | 10-2016-0147450 A | 12/2016 | |
| KR | 10-2017-0126295 A | 11/2017 | |
| KR | 10-2018-0109229 A | 10/2018 | |
| KR | 10-2021050 B1 | 9/2019 | |
| KR | 10-2108962 B1 | 5/2020 | |
| KR | 10-2303115 B1 | 9/2021 | |
| KR | 10-2362268 B1 | 2/2022 | |

OTHER PUBLICATIONS

Extended European Search Report dated Oct. 25, 2023, issued in European Patent Application No. 21834394.5.

Korean Office Action dated May 7, 2024, issued in Korean Application No. 10-2020-0080848.

European Search Report dated Dec. 9, 2024; European Appln. No. 21 834 394.5-1218.

Extended European Search Report dated Oct. 21, 2025; European Appln. No. 25193971.6-1218 / 4617843.

* cited by examiner

ELECTRONIC DEVICE AND METHOD FOR PROVIDING AUGMENTED REALITY

CROSS-REFERENCE TO RELATED APPLICATION(S)

This application is a continuation application, claiming priority under § 365(c), of an International application No. PCT/KR2021/007733, filed on Jun. 21, 2021, which is based on and claims the benefit of a Korean patent application number 10-2020-0080848, filed on Jul. 1, 2020, in the Korean Intellectual Property Office, the disclosure of which is incorporated by reference herein in its entirety.

BACKGROUND

1. Field

The disclosure relates to an electronic device for providing augmented reality and an operation method thereof.

2. Description of Related Art

As an electronic device (e.g., an augmented reality (AR) device) capable of implementing virtual reality (VR) has been developed, there has been an increase in interest therein. Unlike VR based on a completely virtual world, the AR may overlap (combine) and show a virtual object or virtual information on an object and/or an environment in a real world, thus more increasing the effect of reality. The AR may be applied to various real environments. Particularly, the AR is attracting attention as a next-generation technology suitable for a ubiquitous environment or an internet-of-things (IoT) environment.

The above information is presented as background information only to assist with an understanding of the disclosure. No determination has been made, and no assertion is made, as to whether any of the above might be applicable as prior art with regard to the disclosure.

SUMMARY

A user should wear an AR device to experience AR. A space where the AR device is able to provide a user with AR may be referred to as an AR space. The user may see AR of a region corresponding to a maximum viewing angle of the user by means of the AR device. AR that the user is currently viewing by means of a display of the AR device may be referred to as a user screen. Because the user screen is limited as a portion of the AR space, only an AR element (e.g., an application) located in the region corresponding to the maximum viewing angle of the user may be displayed on the user screen. The user needs to identify all of AR elements capable of being displayed on the AR space to effectively use AR provided by the AR device. For example, when the user wants to identify presence of an app which is present outside the user screen or wants to use the app, he or she needs to identify a location and a direction of the corresponding app.

Aspects of the disclosure are to address at least the above-mentioned problems and/or disadvantages and to provide at least the advantages described below. Accordingly, an aspect of the disclosure is to provide an electronic device for providing augmented reality and an operation method thereof.

Additional aspects will be set forth in part in the description which follows and, in part, will be apparent from the description, or may be learned by practice of the presented embodiments.

In accordance with an aspect of the disclosure, an augmented reality (AR) device supporting AR is provided. The AR device includes a memory storing data for at least one AR element mapped to an AR space, at least one sensor, a display, and a processor. The memory may store instructions, when executed, causing the processor to provide the AR outputting at least some of the at least one AR element on a field of view (FOV) region of a user as a user screen by means of the display, receive a first user input using the at least one sensor, and display a user interface on which a relative location of the at least one AR element is displayed on the user screen, in response to the first user input.

In accordance with another aspect of the disclosure, an operation method of an augmented reality (AR) device supporting AR is provided. The operation method includes providing the AR outputting at least some of at least one AR element on a field of view (FOV) region of a user as a user screen by means of a display, receiving a first user input using at least one sensor, and displaying a user interface on which a relative location of the at least one AR element is displayed on the user screen, in response to the first user input.

According to various embodiments disclosed in the disclosure, the AR device may provide a user interface such that the user identifies an AR element capable of being displayed on an AR space.

According to various embodiments disclosed in the disclosure, the AR device may provide a user and may navigate a target app, such that the user navigates the target app, or may display the target app on a user screen.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
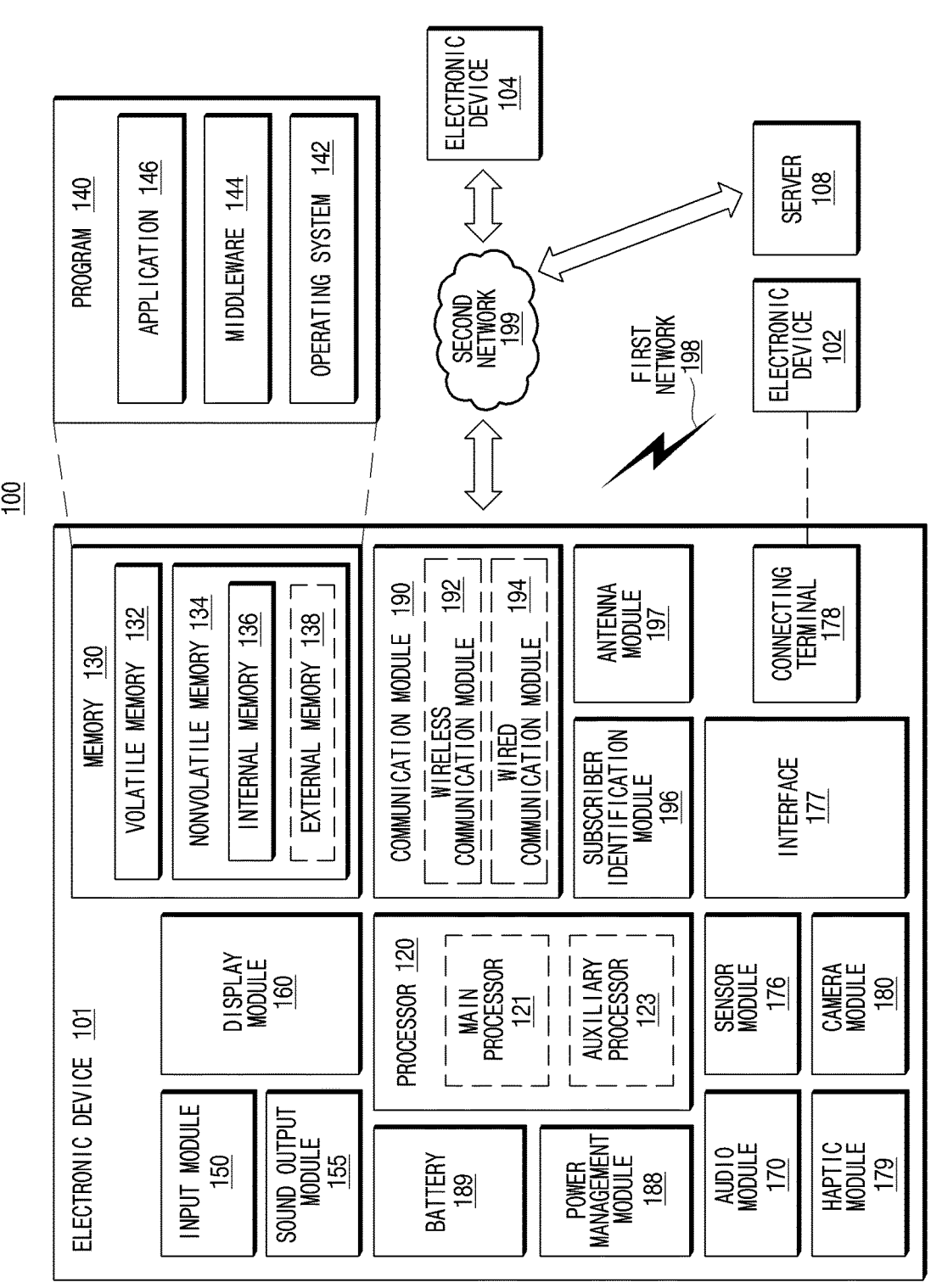
FIG. 1 is a block diagram illustrating an electronic device in a network environment, according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or user plane (U-plane) latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
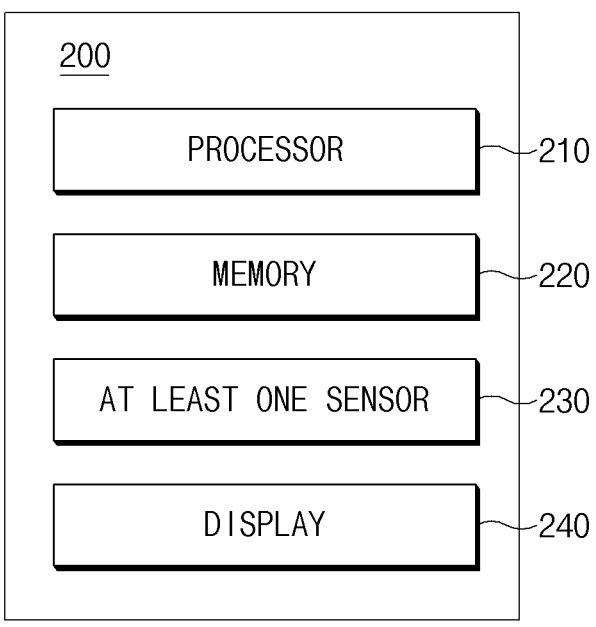
FIG. 2 is a block diagram illustrating a configuration of an AR device according to an embodiment of the disclosure.

FIG. 2 is a block diagram illustrating a configuration of an AR device according to an embodiment of the disclosure.

Referring to FIG. 2, an AR device 200 (e.g., an electronic device 101 of FIG. 1) may include a processor 210, a memory 220, at least one sensor 230, and/or a display 240. The configuration of the AR device 200 of FIG. 2 is illustrative, and the AR device 200 may further include another component. For example, the AR device 200 may further include a wireless communication circuit.

The processor 210 (e.g., 120 of FIG. 1) may execute, for example, software (e.g., a program 140 of FIG. 1) to control at least one other component (e.g., a hardware or software component) of the AR device 200 connected with the processor 210 and may perform a variety of data processing and calculation. According to an embodiment, as at least a portion of data processing or calculation, the processor 210 may store commands or data received from another component (e.g., the at least one sensor 230) in a volatile memory (e.g., 132 of FIG. 1), may process the commands or data stored in the volatile memory 132, and may store result data in a non-volatile memory (e.g., 134 of FIG. 1). The processor 210 may process calculation for providing AR. The processor 210 may process calculation for providing AR by dividing it with an external device (e.g., 101 of FIG. 1) (e.g., cloud computing). For example, when the AR device 200 further includes a wireless communication circuit (e.g., 190 of FIG. 1), the processor 210 may exchange data for providing AR with the external device through the wireless communication circuit. The external device may process calculation associated with data and may transmit the data to the AR device 200.

The memory 220 (e.g., 130 of FIG. 1) may store various pieces of data used by at least one component (e.g., the processor 210 or the at least one sensor 230) of the AR device 200. The data may include, for example, input data or output data associated with software (e.g., a program 140 of FIG. 1) and a command associated with it. The memory 220 may include the volatile memory 132 or the non-volatile memory 134. The memory 220 may store data for providing AR. For example, the memory 200 may store data for AR elements mapped to an AR space.

The at least one sensor 230 (e.g., a sensor module 176 of FIG. 1) may sense an operation state (e.g., power) of the AR device 200 or an external environment state (e.g., a user state) and may generate an electrical signal or a data value corresponding to the sensed state. According to an embodiment, the at least one sensor 230 may include, for example, a gesture sensor, an acceleration sensor, a grip sensor, a proximity sensor, a color sensor, and/or a biometric sensor. The AR device 200 may detect an operation of a user using the at least one sensor 230 and may provide AR based on the operation of the user.

According to an embodiment, the display 240 (e.g., a display module 160 of FIG. 1) may visually provide information to the outside (e.g., the user) of the AR device 200. For example, the display 240 may be understood as a see-through display. The AR device 200 may output an AR element on the display 240. The user may see the AR element disposed on the AR space by means of the display 240. A space (or region) that the user is able to see by means of the display 240 of the AR device 200 in the AR space may be referred to as a user screen.

The AR device 200 may provide the user with AR by means of the display 240. The AR may be understood as the case where the AR element is output on the AR space corresponding to the user screen.

According to an embodiment, the AR device 200 may recognize an object and an environment of the AR space and may map an AR element corresponding to it to the recognized object or environment. The AR device 200 may store the mapping data in the memory 220. For example, when recognizing a TV in the AR space, the AR device 200 may map an application (e.g., an image application) associated with the TV to the TV. The mapping data may be stored in the memory 220. According to another embodiment, when further including a wireless communication circuit, the AR device 200 may receive mapping data for the AR space from a server (e.g., 108 of FIG. 1). For example, where there is a history where the AR space is already provided, mapping data for the AR space may be stored in the server (e.g., a cloud). The AR device 200 may receive mapping data from the server and may store the received mapping data in the memory 220.

The AR device 200 may bring data from the memory 220 to output an AR element on the AR space. The AR device 200 may receive a user input (e.g., a gesture) to the AR element and may provide AR in response to the user input. For example, the AR device 200 may output an application (e.g., the image application) on a specific object of the AR space and may receive a user input (e.g., a touch gesture) to run (e.g., play) the application (e.g., the image application).

The AR device 200 may obtain data associated with an operation of the user (e.g., information associated with a movement direction of the user, a movement speed of the user, a gaze direction of the user, and/or a head direction of the user) using the at least one sensor 230. For example, the operation of the user may be understood as the case where the user moves his or her body's part (e.g., a hand or a foot). When the operation of the user corresponds to a predetermined gesture, the AR device 200 may recognize the operation of the user as a user input. For example, when the user performs a specific operation (e.g., a touch gesture) with respect to an AR element (e.g., an application), the AR device 200 may recognize the operation of the user as a user input. The AR device 200 may execute the AR element (e.g., the application) in response to the user input.

Figure 3:
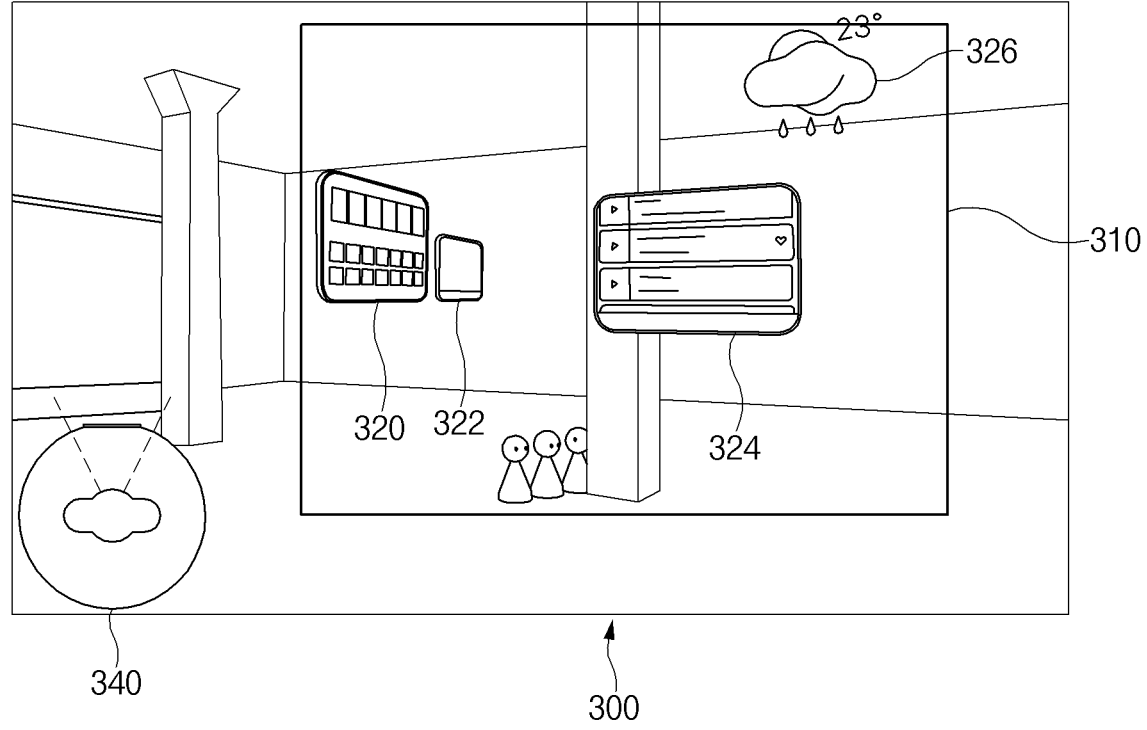
FIG. 3 illustrates AR provided by an AR device according to an embodiment of the disclosure.

FIG. 3 illustrates AR provided by an AR device according to an embodiment of the disclosure.

An AR space 300 of FIG. 3 may be understood as the case where the AR element is output on an object and an environment of a real space where a user and an AR device 200 are located. The AR device 200 may output AR elements 320, 322, 324, 326, and 340 on the AR space 300. In an embodiment, the AR elements 320, 322, 324, 326, and 340 may be fixed at specified locations. For example, the AR elements 320, 322, 324, 326, and 340 may be mapped to specific coordinates or objects (e.g., home appliances) in a real space. The AR elements 320, 322, 324, 326, and 340 may be displayed on a display (e.g., 240 of FIG. 2) in various forms. The forms where the AR elements 320, 322, 324, 326, and 340 are displayed will be described in detail in FIG. 4.

Because a size of a display 240 or a viewing angle of a user has a physical limit, the user may see only a portion of the AR space 300 by means of the AR device 200. For example, the user may see a region corresponding to a field of view (FOV) region 310 by means of the AR device 200. A portion of the AR space 300 provided by means of the display 240 by the AR device 200 may be referred to as a user screen. The user needs to move his or her gaze to see an AR element capable of being displayed on the outside of the user screen.

The AR elements 320, 322, 324, 326, and 340 represented on the AR space 300 are illustrative, and an embodiment of the disclosure is not limited thereto. For example, FIG. 3 illustrates the embodiment in which the AR element 340 indicating a gaze and a location of the user is output on the outside of the user screen. However, according to another embodiment, the AR element 340 may be output on the inside of the user screen. For another example, the AR element 340 indicating the gaze and the location of the user may fail to be output by the AR device 200. For another example, the AR element 340 may be output at a fixed location in the user screen.

Figure 4:
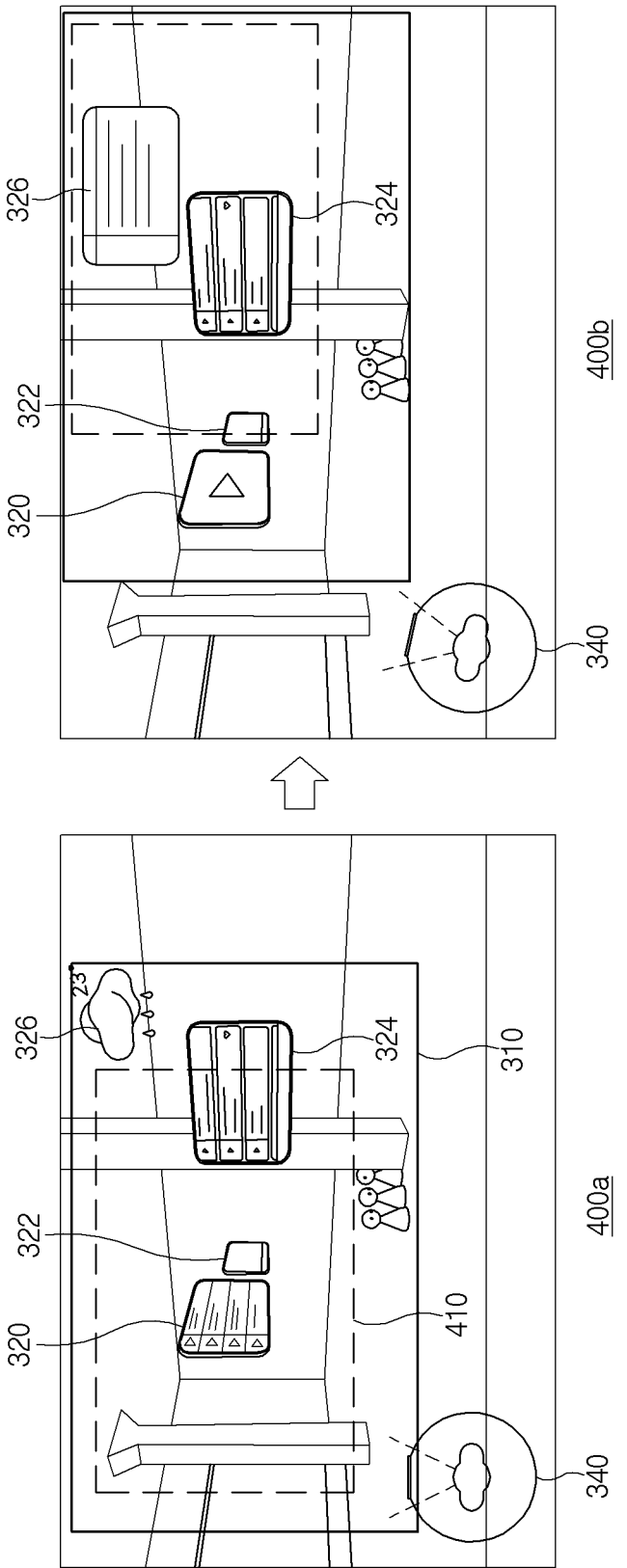
FIG. 4 illustrates a method for displaying an AR element according to an embodiment of the disclosure.

FIG. 4 illustrates a method for displaying an AR element according to an embodiment of the disclosure.

According to an embodiment, an AR device (200 of FIG. 2) may differently display AR elements 320, 322, 324, and 326 on a user screen depending on locations of the AR elements 320, 322, 324, and 326. The user screen may be referred to as AR that the user is able to see by means of a display (e.g., 240 of FIG. 2) of the AR device 200. A size of the user screen may be understood as corresponding to an FOV region (e.g., 310 of FIG. 3) of the user. The FOV region 310 may include a field of interest (FOI) region 410. The FOI region 410 may refer to a region which is smaller in size than the FOV region 310. The FOI region 410 may refer to a region that the user looks at with more interest in the FOV region 310. In an embodiment, a size of the FOI region 410 may be adjusted. For example, the AR device 200 may change an area of the FOI region 410 depending on user settings.

According to an embodiment, the AR elements 320, 322, 324, and 326 may be displayed differently according to their locations in the user screen. In 400a, the applications 320, 322, and 324 among the AR elements 320, 322, 324, and 326 may be located in the FOI region 410 and the application 326 may be located between the FOV region 310 and the FOI region 410. The AR device 200 may output the applications 320, 322, and 324 located in the FOI region 410 in the form of a preview and may output the application 326 located between the FOV region 310 and the FOI region 410 in the form of a widget. For example, the preview may be understood as a user interface in which a function of the application is partially executed. The user may user a portion of a function (e.g., image playback) capable of being used when running an application (e.g., an image application) by means of the preview. For example, the widget may be understood as a user interface which briefly displays a function and/or content (weather information) of an application (e.g., a weather application).

Referring to FIG. 4, according to an embodiment, when the user moves his or her gaze on a user screen in 400a like a user screen in 400b to see another region of an AR space, the AR elements 320, 322, 324, and 326 may be displayed differently. For example, when the user moves his or her gaze to the right in 400a like 400b, the user screen provided by the AR device 200 may be for a region more moved to the right than that in 400a. As the user screen is moved, regions where the AR elements 320, 322, 324, and 326 are located in the user screen may vary. In 400b, the applications 322, 324, and 326 may be located in the FOI region 310, and the application 320 may be located between the FOV region 310 and the FOI region 410. Thus, the AR device 200 may output the applications 322, 324, and 326 on the display 240 in the form of a preview and may output the application 320 on the display 240 in the form of a widget. The AR device 200 may display an AR element located on a region (i.e., the FOI region 410) that the user looks at with more interest differently from another AR element, thus increasing concentration on an application that the user wants to see.

Because AR that the user is able to see by means of the AR device 200 is limited, the user needs to move his or her gaze like FIG. 4 to execute or see an AR element (e.g., a preview or a widget) outside the user screen. Alternatively, when the user does not know a location of the AR element that he or she wants to execute or see, he or she needs to navigate an AR space to navigate the location of the AR element. To solve the above-mentioned inconvenience of the user, the AR device 200 may provide a user interface (UI) for assisting in identifying, executing, and/or navigating an AR element capable of being displayed on the AR space. The UI will be described in detail in FIG. 5.

Figure 5:
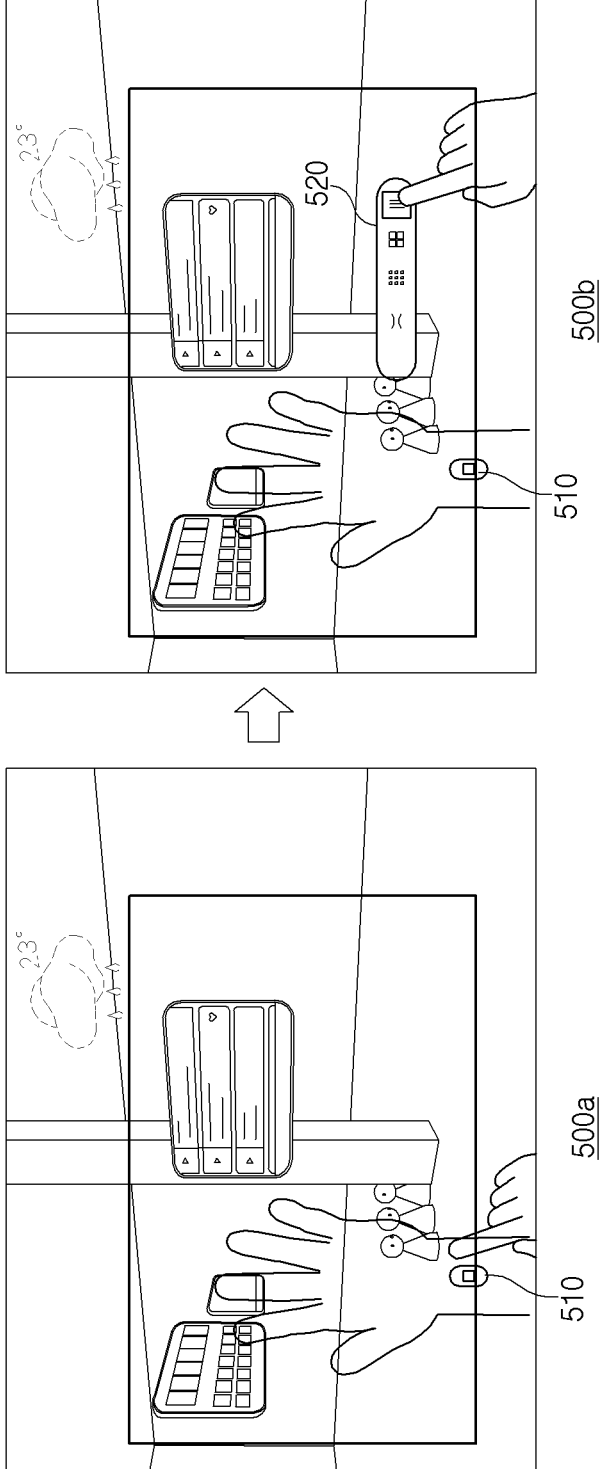
FIG. 5 illustrates a user input in AR according to an embodiment of the disclosure.

FIG. 5 illustrates a user input in AR according to an embodiment of the disclosure.

An AR device (e.g., 200 of FIG. 2) may provide AR of FIGS. 2 to 4 by means of a display (e.g., 240 of FIG. 2). The AR device 200 may receive a user input to an AR element using at least one sensor (e.g., 230 of FIG. 2). For example, the user input may be understood as various gestures using a body's part (e.g., a hand or a foot)

Referring to FIG. 5, in 500a, the AR device 200 may recognize a body's part (e.g., a hand) of a user using the at least one sensor 230. The AR device 200 may recognize a body's part of the user and may output an AR element 510 capable of receiving an input of the user on the body's part of the user. Because an application 326 is located outside an FOV region (e.g., 310 of FIG. 3) in FIG. 5, it may fail to be displayed on a user screen. The AR device 200 may receive a user input to the AR element 510. For example, the user input may be referred to as a touch, swiping, and/or a double tap gesture of the user on the AR element 510. The description of the user input is illustrative, and the user input may include all gestures for selecting the AR element 510.

In 500*a*, the AR device 200 may output a user menu 520 in response to the user input in 500*a*. The user menu 520 may be understood as an AR element for outputting a user interface. The AR device 200 may receive a user input to the user menu 520 and may output a user interface described below.

FIG. 5 is an example for describing the user input for outputting the user interface, and an embodiment of the disclosure is not limited thereto. For example, the user input for outputting a user interface in 500*a* and 500*b* may be performed by one user input. For example, the AR device 200 may receive a user input to an AR element (e.g., a shortcut key) output and may output a user interface.

Figure 6:
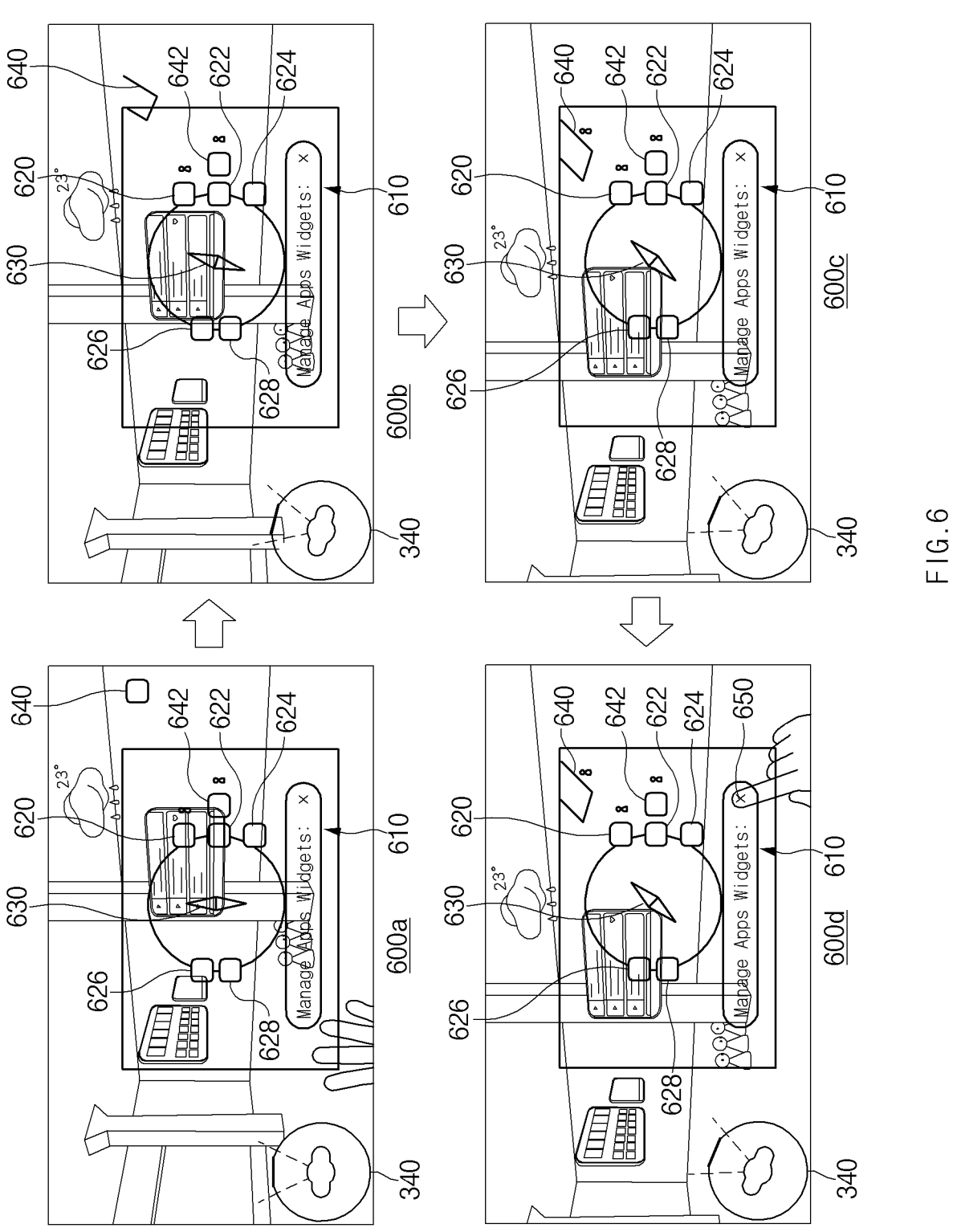
FIG. 6 illustrates a user interface according to an embodiment of the disclosure.

FIG. 6 illustrates a user interface according to an embodiment according to an embodiment of the disclosure.

According to an embodiment, an AR device (e.g., 200 of FIG. 2) may receive a user input of FIG. 5 and may output a user interface 610. The user interface 610 may indicate types, relative locations, and/or directions of AR elements capable of being displayed on an AR space.

Referring to FIGS. 6, 600*a* to 600*d* indicate the user interface 610 according to an embodiment. The user interface 610 may be provided in another method.

Referring to FIG. 6, 600*a*, the user interface 610 may include at least one graphic object 620, 622, 624, 626, 628, and 642 and an indicator 630 (e.g., a compass shape) indicating a direction of the AR device. The AR device 200 may output the user interface 610 together on an AR space (e.g., 300 of FIG. 3). The at least one graphic object 620, 622, 624, 626, 628, and 642 may correspond to AR elements (e.g., applications 320, 322, 324, and 326 of FIG. 3) capable of being displayed on the AR space. The at least one graphic object 620, 622, 624, 626, 628, and 642 may indicate relative locations and/or directions of the AR elements respectively corresponding thereto. For example, the graphic object 620 may correspond to an application 640, which may indicate a relation location and/or direction from a user of the application 640. The user, the graphic object 620, and the application 640 may be aligned in one direction on the user interface 610. The gaze and direction of the user in 660*a* may be displayed like an AR element 340 in 600*a*. The application 640 in 600*a* may be an AR element capable of being displayed on the outside of a user screen, which is not visible to the user. However, the AR device 200 may notify the user of a location and/or a direction of the application 640 by means of the user interface 610.

The indicator 630 may be understood as indicating locations and gaze directions of the AR device 200 and the user in the AR space. For example, a direction indicated by one side of the indicator 630 and a direction that the user is looking at in the AR element 340 may be identical to each other. When the location and the gaze direction of the user is moved, the AR device 200 may display the indicator 630 in which it is reflected on the user interface 610.

When the user moves the gaze direction and the location to the right in 600*a*, the AR device 200 may output the user interface 610 like 600*b*. The gaze direction of the user may be referenced by the AR element 340 in 600*b*. A description of the AR element 340 may be referenced by the description of FIG. 3. Referring to 600*b*, the indicator 630 may interwork with gaze movement of the user to rotate such that its one side more indicates the right than that in 600*a*. The user may know that the gaze direction of the user moves in a direction where the application 640 is located by means of the user interface 610.

When the user moves the gaze direction and the location to the right in 600*b*, the AR device 200 may output the user interface 610 like 600*c*. The gaze direction of the user may be referenced by the AR element 340 in 600*c*. Referring to 600*c*, the indicator 630 may interwork with gaze movement of the user to rotate such that its one side more indicate the right than that in 600*b*. The user may know that the gaze direction of the user is aligned with the direction where the application 640 is located by means of the user interface 610. When at least a portion of the application 640 is located in an FOV region 310 due to the location and gaze movement of the user, it may be displayed on a user screen.

600*d* illustrates a user input ending the user interface 610. The AR device 200 may provide an AR element 650 for ending the user interface 610. The AR device 200 may receive the user input to the AR element 650 to remove the user interface 610 and may provide AR.

The AR device 200 may provide the user interface 610 to assist the user to easily identify the relative location and direction of the AR element capable of being displayed on the AR space.

Figure 7:
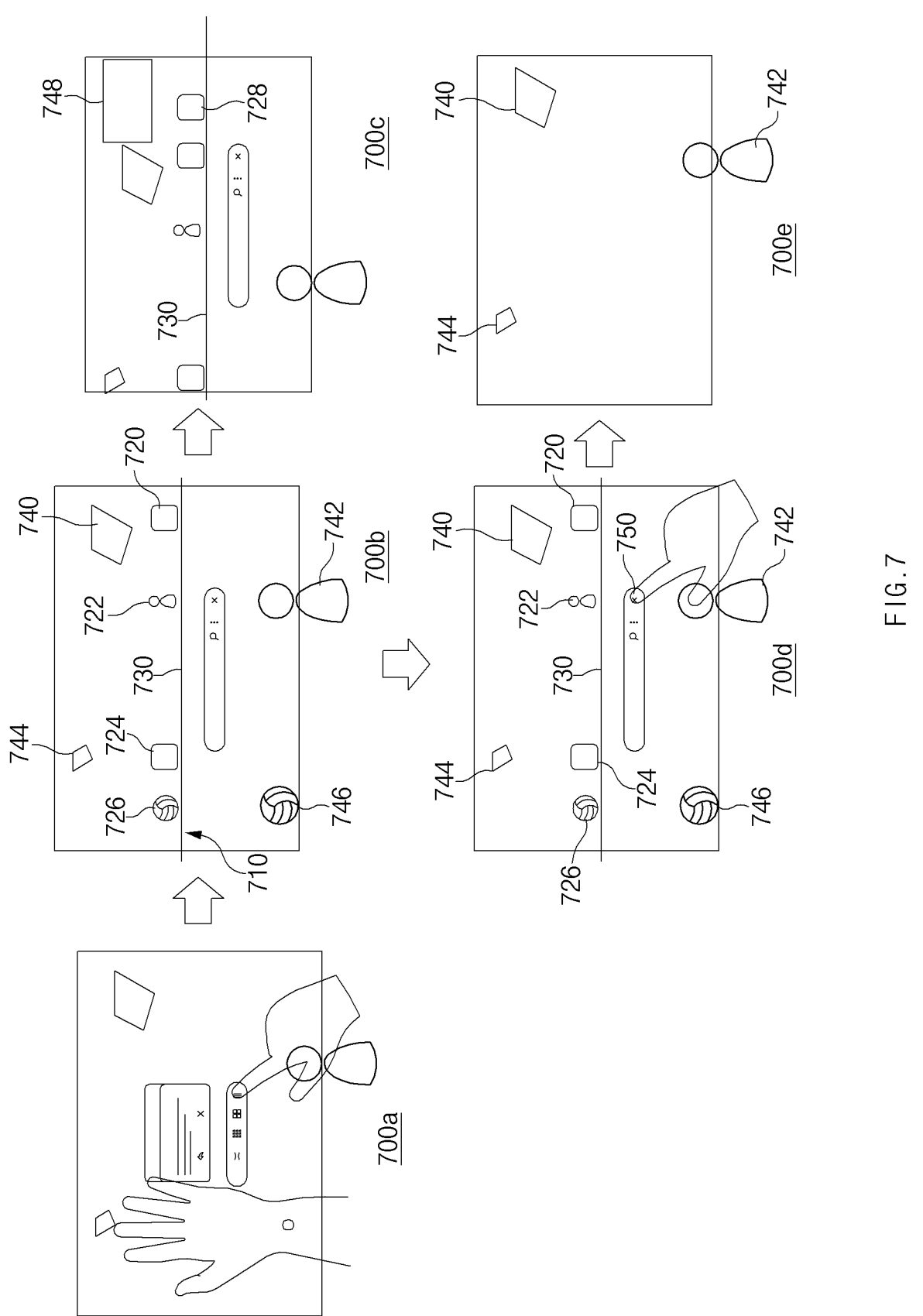
FIG. 7 illustrates a user interface according to an embodiment of the disclosure.

FIG. 7 illustrates a user interface according to an embodiment according to an embodiment of the disclosure.

700*a* illustrates that an AR device 200 receives a user input of FIG. 5. A description of 700*a* may be referenced by the description of FIG. 5. The AR device 200 may output a user interface 710 in 700*b* in response to a user input.

Referring to FIG. 7, 700*b*, the user interface 710 may include at least one graphic object 720, 722, 724, and 726 and a bar object 730. The at least one graphic object 720, 722, 724, and 726 may correspond to AR elements 740, 742, 744, and 746, respectively. The at least one graphic object 720, 722, 724, and 726 may indicate relative locations and directions of the corresponding AR elements 740, 742, 744, and 746 on the bar object 730. The at least one graphic object 720, 722, 724, and 726 may be displayed at the same size on the bar object 730, irrespective of distances between the corresponding AR elements 740, 742, 744, and 746 and a user. For example, because the application 722 is located in a place relatively closer to the user than the application 724, it may appear larger to the user. However, the graphic objects 622 and 624 corresponding to them may be displayed at the same size on the bar object 730.

When the gaze of the user in 700*b* moves to the right, the AR device 200 may output the user interface 710 like 700*c*. Referring to 700*c*, the bar object 730 may interwork with the gaze movement of the user to rotate to the right. As the bar object 730 rotates, a new application 748 may be displayed on the user screen. The AR device 200 may display a graphic object 728 corresponding to the new application 748 on the bar object 730.

700*d* illustrates a user input ending the user interface 710. The AR device 200 may provide an AR element 750 for ending the user interface 710. The AR device 200 may receive a user input to the AR element 750. A description of the user input may be referenced by the description of FIG. 5. The AR device 200 may remove the user interface 710 in response to the user input and may provide AR such as 700*e*.

Figure 8:
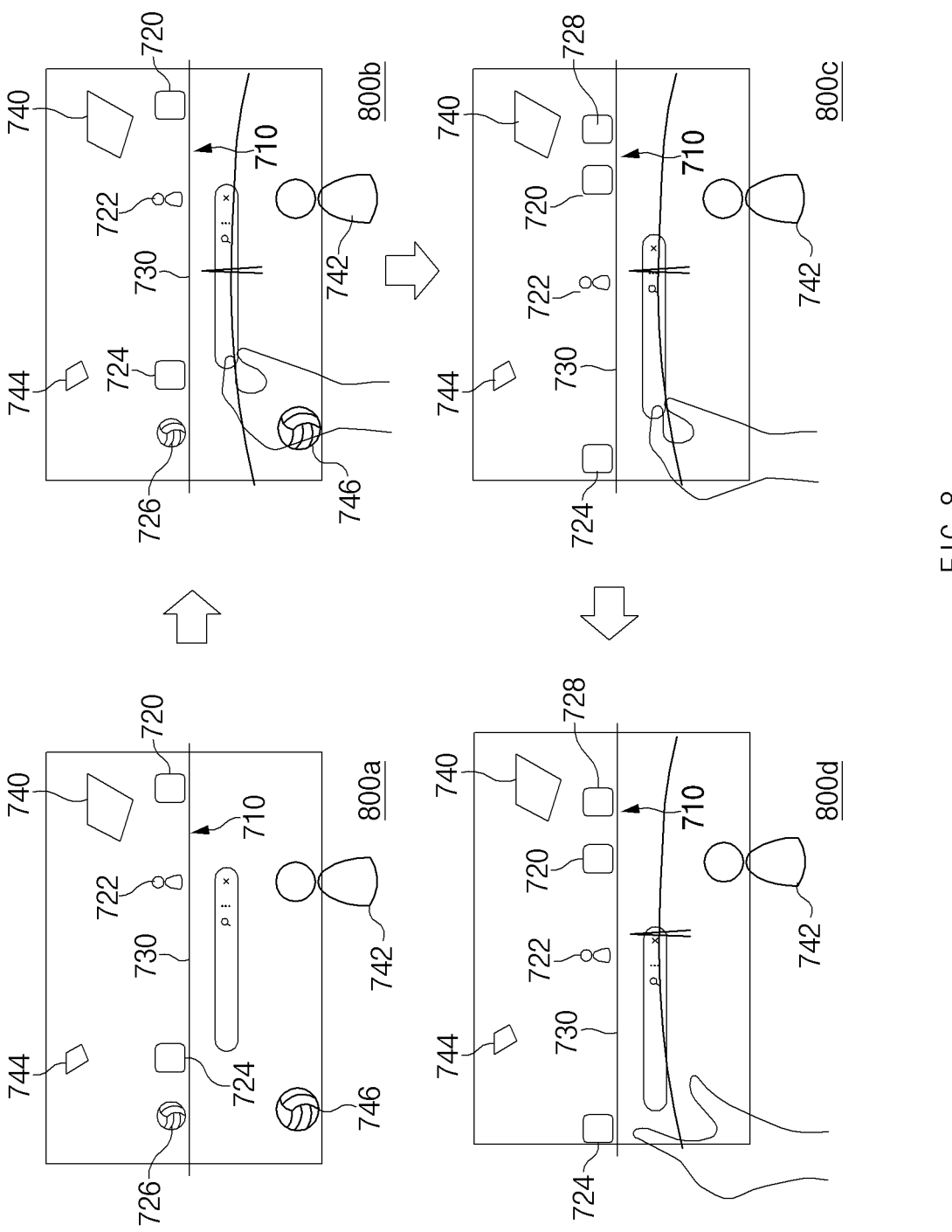
FIG. 8 illustrates a user interface according to an embodiment of the disclosure.

FIG. 8 illustrates a user interface according to an embodiment of the disclosure.

Corresponding to reference numerals of FIG. 7 among reference numerals of FIG. 8 may be referenced by the description of FIG. 7. A portion different from FIG. 7 will be described in FIG. 8, Referring to 800a, a user interface 710 may include at least one graphic object 720, 722, 724, and 726 and a bar object 730. Unlike FIG. 7, the user interface 710 of FIG. 8 may be manipulated by a user gesture (e.g., grab and release).

Referring to FIG. 8, 800b, an AR device 200 may receive a user input and may manipulate the user interface 710. For example, a user may perform a grab operation using his or her body's part (e.g., a hand) with respect to a predetermined region of the user interface 710. After the grab operation, the user may move the body's part (e.g., the hand) to the left or right to rotate the bar object 730. When the user moves the body's part (e.g., the hand) in the state where he or she grabs the bar object 730, the bar object 730 in 800b may rotate in a counterclockwise direction like 800c. Referring to 800c, the at least one graphic object 720, 722, 724, and 726 displayed on the bar object 730 may be displayed at a location where it rotates together with the bar object 730. However, because the user input of FIG. 8 is to the user interface 710, AR may be provided irrespective of the user input. For example, when the gaze of the user is fixed, although the bar object 730 rotates from 800b to 800c, AR elements 740, 742, 744, and 746 may be displayed at fixed locations.

Referring to FIG. 8, the user may manipulate only the bar object 730 and may identify an AR element capable of being displayed on an AR space irrespective of the gaze of the user. In this case, the at least one graphic object 720, 722, 724, 726, and 728 may fail to be aligned with AR elements 740, 742, 744, 746, and 748 respectively corresponding thereto.

Referring to FIG. 8, 800d, the AR device 200 may receive a user input and may fix the bar object 730 in a rotated state. For example, the user input in 800d may be understood as a release operation of releasing the grab.

Figure 9:
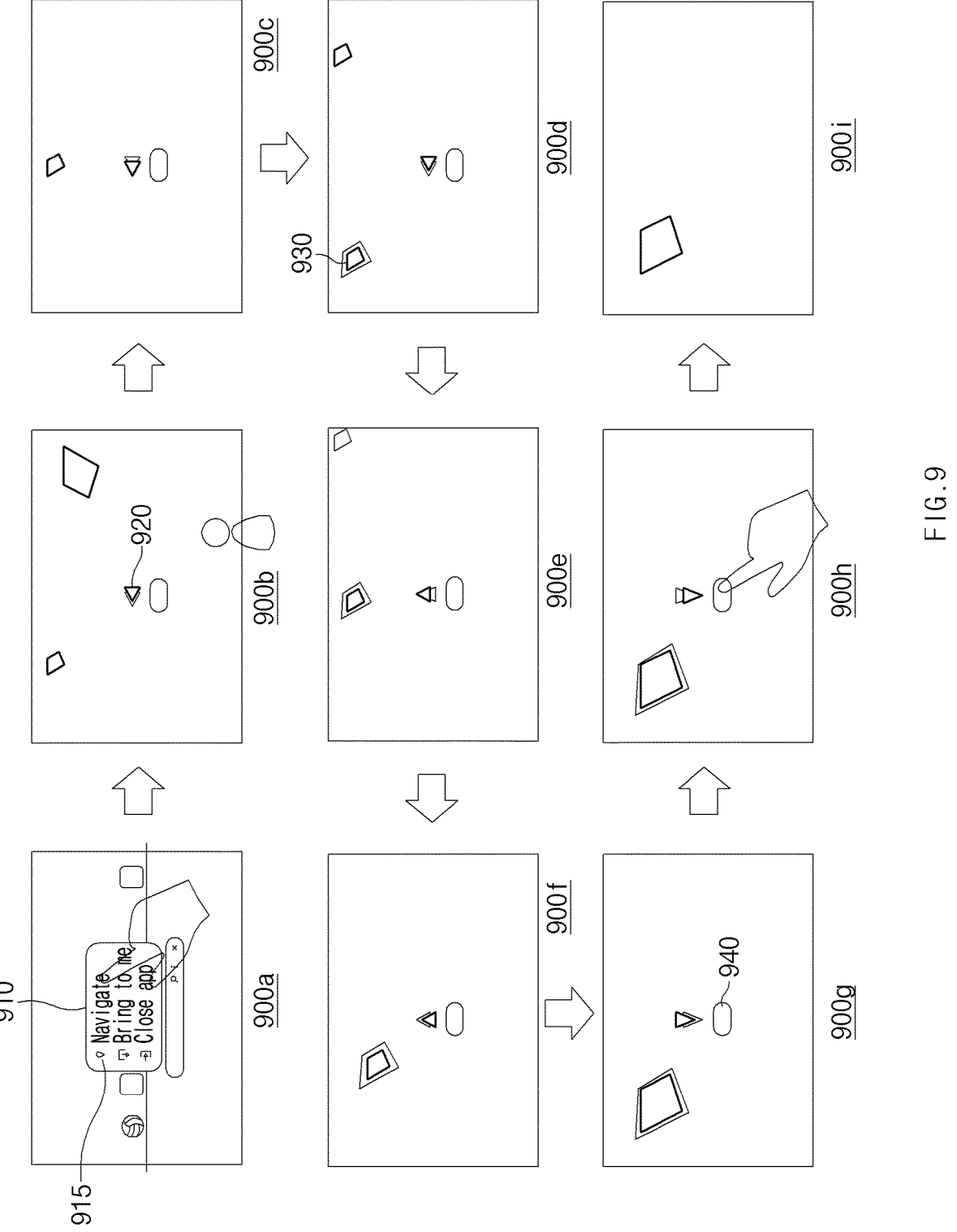
FIG. 9 illustrates a navigating function provided by an AR device according to an embodiment of the disclosure.

FIG. 9 illustrates a navigating function provided by an AR device according to an embodiment of the disclosure.

900a is that an AR device (e.g., 200 of FIG. 2) outputs a user menu 910 for providing various functions on a user interface 710 of FIG. 8. The AR device 200 may receive a user input to the user menu 910 and may perform a navigating function. For example, the user input may be referred to as an operation where a user selects a navigate object 915 using his or her body's part (e.g., a hand) The user input to the navigate object 915 may include a user input selecting a target application which becomes a navigating target. A navigating function will be described in 900b to 990i.

Referring to FIG. 9, in 900b, when the navigating function is executed, the AR device 200 may output an indicator 920 (e.g., an arrow) indicating a relative location and direction of the target application. The user may identify the relative location and direction of the target application by means of a direction indicated by the indicator 920.

Referring to FIG. 9, in 900c to 900f, the user may move in a direction and location indicated by the indicator 920. For example, because the indicator 920 indicates the left in 900c, the user may move to the left along the indicator 920. In 900d, the target application may be located in a user screen. The AR device 200 may perform a separate indication to indicate that a specific application displayed on the user screen is the target application 930. For example, the AR device 200 may further display a quadrangular shape surrounding the target application. In 900e to 900f, the user may move in a direction where the target application 930 is located along the indicator 920.

When the user moves in the direction of the target application 930 and a distance between the user and the target application is within a certain distance (e.g., 100 m) as in 900g, the AR device 200 may differently output a shape of the indicator 920. In 900h, the AR device 200 may receive a user input to an AR element 940. In 900i, the AR device 200 may end the navigating function in response to the user input and may provide AR. The target application may be displayed in the form of a preview or a widget on the user screen.

The user may identify an AR element capable of being displayed on the AR space using the navigation function of FIG. 9 and may easily move to a place where the target application is located.

Figure 10:
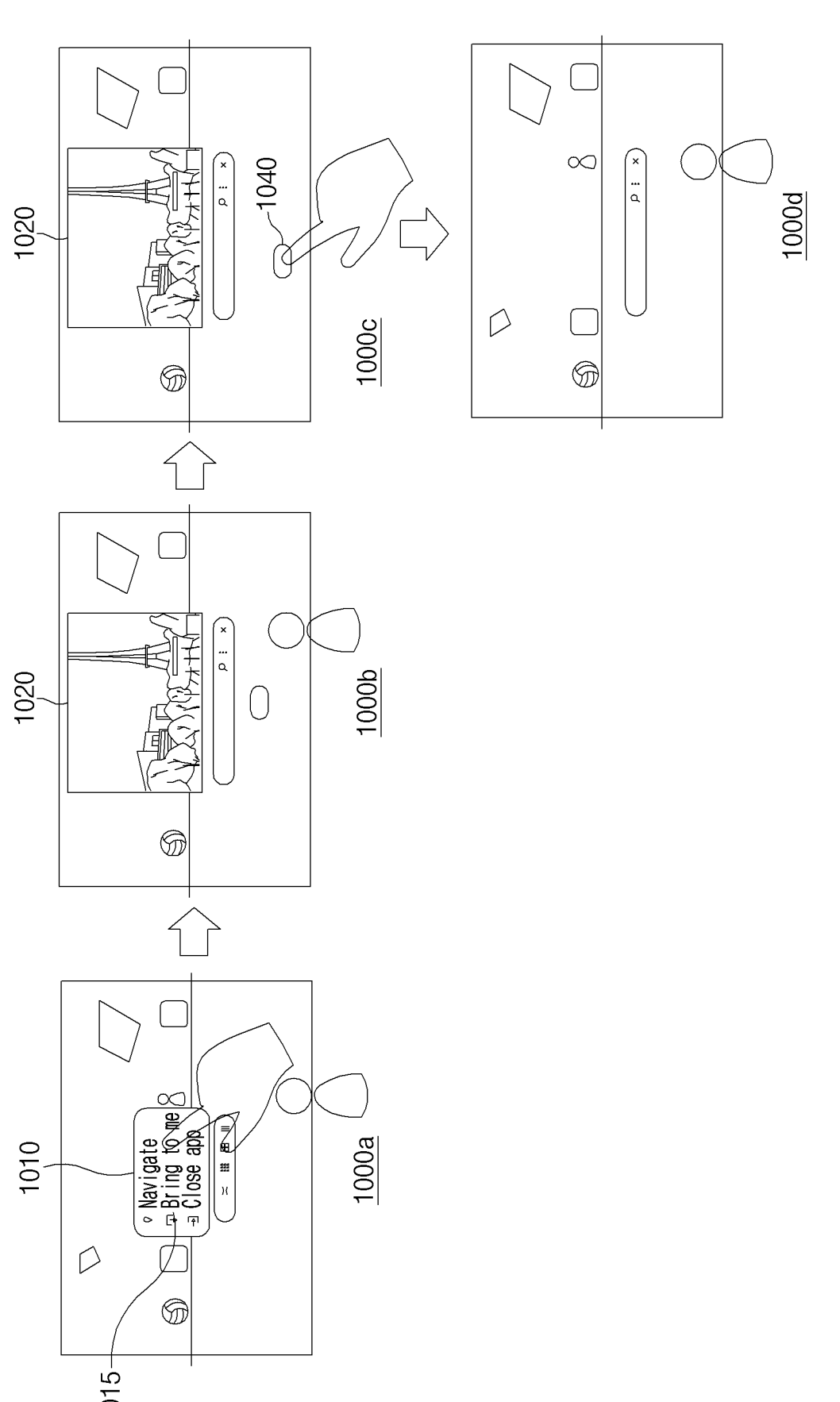
FIG. 10 illustrates a bringing function provided by an AR device according to an embodiment of the disclosure.

FIG. 10 illustrates a bringing function provided by an AR device according to an embodiment of the disclosure.

1000a is that an AR device (e.g., 200 of FIG. 2) outputs a user menu 1010 for providing various functions on a user interface 710 of FIG. 8. The AR device 200 may receive a user input to the user menu 1010 and may perform a bringing function. For example, the user input may be referred to as an operation where a user selects a bring to me object 1015 using his or her body's part (e.g., a hand) The user input to the bring to me object 1015 may include a user input selecting a target application which becomes a bringing target. A bringing function will be described in 1000b to 1000d.

Referring to FIG. 10, in 1000b, when the bringing function is executed, the AR device 200 may bring a target application 1020 to a user screen. The target application 1020 may be displayed or run as a preview. In 1000c, the AR device 200 may receive a user input to an AR element 1040. In 1000d, the AR device 200 may end the bringing function in response to the user input.

The user may identify an AR element located outside the user screen, using the bringing function of FIG. 10, and may display or execute the target application on the user screen.

Figure 11:
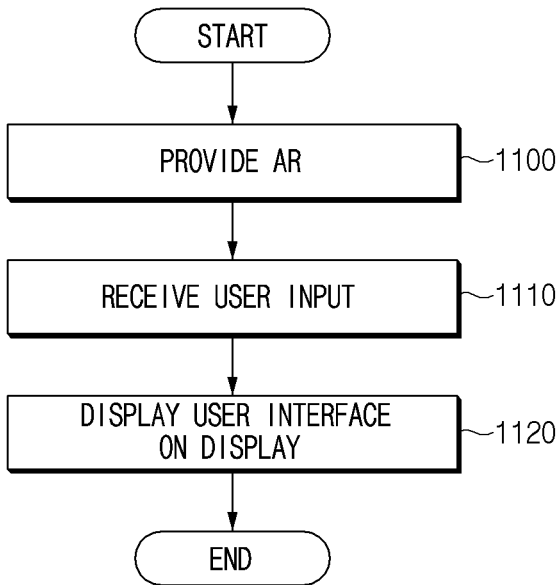
FIG. 11 illustrates a flowchart of a method for providing a user interface according to an embodiment of the disclosure.

FIG. 11 illustrates a flowchart of a method for providing a user interface according to an embodiment of the disclosure.

Referring to FIG. 11, in operation 1100, an AR device (e.g., 200 of FIG. 2) may provide a user with AR by means of a display (e.g., 240 of FIG. 2). The AR may be understood as outputting an AR element on an object and/or an environment located in an AR space (e.g., 300 of FIG. 3). The user may see AR corresponding to an FOV region (e.g., 310 of FIG. 3) by means of the AR device 200. A user screen may be referred to as AR that user is able of see by means of the display 240. The FOV region 310 may include an FOI region (e.g., 410 of FIG. 4). The AR element may be displayed differently according to its location in the FOV region 310. For example, the AR element located in the FOI region 410 may be displayed in the form of a preview. The AR element located between the FOI region 410 and the FOV region 310 may be displayed in the form of a widget. Because the region that the user is able to see by means of the AR device 200 is limited, the user needs to identify a location and a direction of an AR element located outside the user screen.

In operation 1110, the AR device 200 may receive a user input (e.g., a gesture) to the AR element. The user input may be performed in various methods. A description of the user input may be referenced by the description of FIG. 5. The user input in operation 1110 may be understood as a user input for outputting a user interface. The user input in operation 1110 may include one or more user inputs until the AR device 200 outputs the user interface.

In operation 1120, the AR device 200 may display a user interface on the display 240. A description of the user interface may be referenced by the description of FIGS. 6 to 8. The user interface may indicate relative locations and directions of AR elements capable of being displayed on an AR space. The user may identify the relative locations and directions of the AR elements capable of being displayed on the AR space by means of the user interface.

Figure 12:
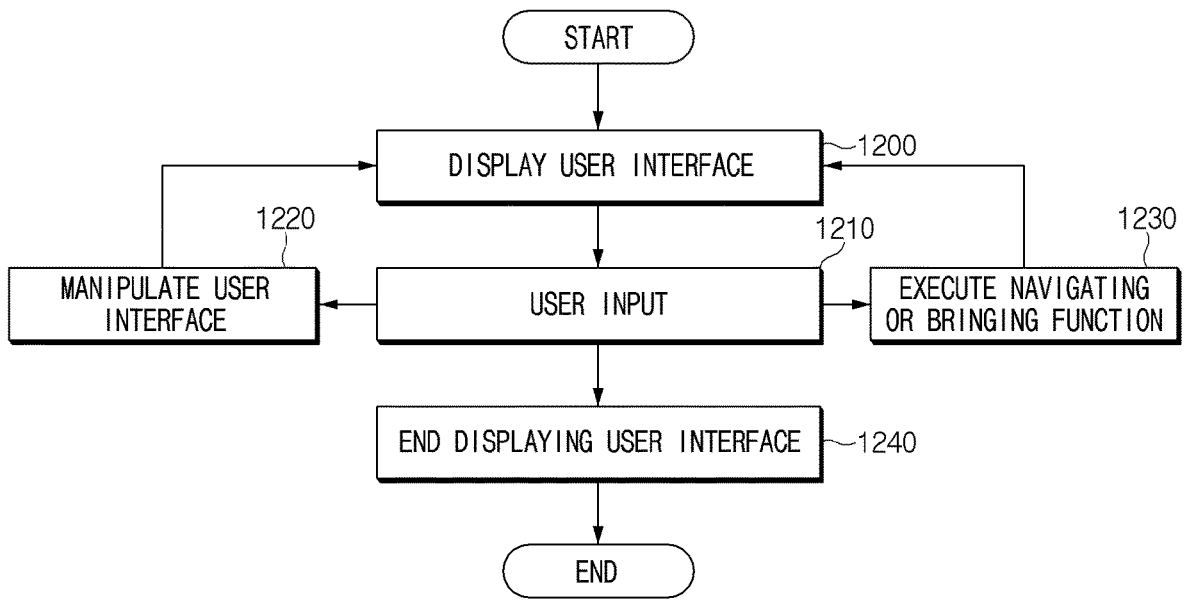
FIG. 12 illustrates a flowchart of various user inputs to a user interface according to an embodiment of the disclosure.

FIG. 12 illustrates a flowchart of various user inputs to a user interface according to an embodiment of the disclosure.

Referring to FIG. 12, in operation 1200, an AR device (e.g., 200 of FIG. 2) may display a user interface on a display (e.g., 240 of FIG. 2) depending on the flowchart of FIG. 11. In operation 1210, the AR device 200 may receive a user input to the user interface. The user input in operation 1210 may be performed for various purposes.

According to an embodiment, the AR device 200 may receive a user input and may proceed to operation 1220. In operation 1220, the user may manipulate the user interface by means of the user input. The AR device 200 may display the user interface manipulated in response to the user input. For example, the user input may be referred to as gaze movement of the user. For another example, the user input may be referred to as a grab and release operation of the user. The user may manipulate the user interface and may more easily identify relative locations and directions of AR elements capable of being displayed on an AR space.

According to another embodiment, the AR device 200 may receive a user input and may proceed to operation 1230. In this case, the user input in operation 1230 may be understood as a user input for executing a navigating or bringing function. For example, the AR device 200 may receive a user input (e.g., a touch gesture) to a navigating object (e.g., 915 of FIG. 9) or a bringing object (e.g., 1015 of FIG. 10) in a user menu (e.g., 910 of FIG. 9 or 1010 of FIG. 10). The user input may include a user input selecting a target application (e.g., 930 of FIG. 9). In operation 1230, the AR device 200 may notify the user of a location and direction of the target application using an indicator (e.g., 920 of FIG. 9) or may bring the target application to a user screen to display or execute the target application as a preview. The user may navigate an AR element outside the user screen or may bring the AR element to the user screen, by means of the navigating or bringing function. The AR device 200 may receive a user input to an AR element (e.g., 940 of FIG. 9 or 1040 of FIG. 10) for ending the navigating or bringing function to end the navigating or bringing function and may display a user interface.

According to another embodiment, in operation 1210, the AR device 200 may receive a user input for ending the user interface. The AR device 200 may proceed to operation 1240 in response to the user input. In operation 1240, the AR device 200 may remove the user interface and may provide AR for an AR space (e.g., 300 of FIG. 3).

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
memory storing one or more computer programs;
a display; and
at least one processor communicatively coupled to the memory and the display, wherein the one or more computer programs include computer-executable instructions that, when executed by the at least one processor individually or collectively, cause the electronic device to:
provide a first region of an augmented reality (AR) environment corresponding to a first field of view (FOV) of a user through the display,
display, while the first region of the AR environment corresponding to the first FOV is provided through the display, an execution screen associated with an application at a first location in the AR environment that corresponds to a central portion of the first region of the AR environment corresponding to the first FOV,
provide, in a state that a FOV of the user has changed from the first FOV to a second FOV of the user based on movement of the user associated with the FOV of the user, a second region of the AR environment corresponding to the second FOV through the display with the execution screen associated with the application remaining at the first location in the AR environment, and
display, based on a first input that is a user selection to initiate a function to relocate the execution screen associated with the application detected while the execution screen is remained outside the second region of the AR environment corresponding to the second FOV, the execution screen associated with the application that is remained outside the second region of the AR environment corresponding to the second FOV at a second location in the AR environment that corresponds to a central portion of the second region of the AR environment corresponding to the second FOV.

2. The electronic device of claim 1,
wherein the one or more computer programs further include computer-executable instructions that, when executed by the at least one processor individually or collectively, cause the electronic device to:
display, while the first region of the AR environment corresponding to the first FOV is provided through the display, an icon associated with the application on a portion of the first region of the AR environment corresponding to the first FOV, and
wherein, while the first region of the AR environment corresponding to the first FOV is provided through the display, the execution screen associated with the application is displayed at the first location in the AR environment, based on a second input being detected that is for the displayed icon.

3. The electronic device of claim 1, wherein the first input is not related to the movement of the user associated with the FOV of the user.

4. The electronic device of claim 1, wherein in case that the FOV of the user associated with movement of the user is unchanged and the first input for initiating the function to relocate the execution screen associated with the application is not received, while the second region of the AR environment corresponding to the second FOV is provided through the display, the execution screen associated with the application remains at the first location in the AR environment.

5. The electronic device of claim 1, wherein the one or more computer programs further include computer-executable instructions that, when executed by the at least one processor individually or collectively, cause the electronic device to at least one of:

display at least one of a relative location or a relative direction for the first region of the AR environment corresponding to the first FOV, or display at least one of a relative location or a relative direction for the second region of the AR environment corresponding to the second FOV.

6. The electronic device of claim 1, wherein the one or more computer programs further include computer-executable instructions that, when executed by the at least one processor individually or collectively, cause the electronic device to:

when the execution screen associated with the application is displayed at the first location in the AR environment while the first region of the AR environment corresponding to the first FOV is provided through the display, fix the execution screen associated with the application at the first location in the AR environment, and wherein, while the second region of the AR environment corresponding to the second FOV is provided through the display with the execution screen associated with the application remaining at the first location in the AR environment, the execution screen associated with the application remains fixed at the first location in the AR environment.

7. The electronic device of claim 1, wherein the one or more computer programs further include computer-executable instructions that, when executed by the at least one processor individually or collectively, cause the electronic device to:

in case the second region of the AR environment corresponding to the second FOV includes the first location of the AR environment while the second region of the AR environment corresponding to the second FOV is provided through the display with the execution screen associated with the application remaining at the first location in the AR environment, display the execution screen associated with the application at a portion of the second region of the AR environment corresponding to the second FOV other than the central portion of the second region of the AR environment corresponding to the second FOV.

8. The electronic device of claim 1, wherein the one or more computer programs further include computer-executable instructions that, when executed by the at least one processor individually or collectively, cause the electronic device to:

in case the second region of the AR environment corresponding to the second FOV does not include the first location of the AR environment while the second region of the AR environment corresponding to the second FOV is provided through the display with the execution screen associated with the application remaining at the first location in the AR environment, not displaying the execution screen associated with the application in the second region of the AR environment corresponding to the second FOV.

9. The electronic device of claim 1, wherein the one or more computer programs further include computer-executable instructions that, when executed by the at least one processor individually or collectively, cause the electronic device to:

display a selectable AR element in the second region of the AR environment corresponding to the second FOV while the execution screen associated with the application is displayed in the second region of the AR environment corresponding to the second FOV, and discontinue, based on a third input for the displayed selectable AR element being detected, the display of the execution screen associated with the application while continuing to provide the second region of the AR environment corresponding to the second FOV through the display.

10. A method performed by an electronic device, the method comprising:

providing a first region of an augmented reality (AR) environment corresponding to a first field of view (FOV) of a user through a display of the electronic device;

displaying, while the first region of the AR environment corresponding to the first FOV is provided through the display, an execution screen associated with an application at a first location in the AR environment that corresponds to a central portion of the first region of the AR environment corresponding to the first FOV;

providing, in a state that a FOV of the user has changed from the first FOV to a second FOV of the user based on movement of the user associated with the FOV of the user, a second region of the AR environment corresponding to the second FOV through the display with the execution screen associated with the application remaining at the first location in the AR environment; and displaying, based on a first input that is a user selection to initiate a function to relocate the execution screen associated with the application detected while the execution screen is remained outside the second region of the AR environment corresponding to the second FOV, the execution screen associated with the application that is remained outside the second region of the AR environment corresponding to the second FOV at a second location in the AR environment that corresponds to a central portion of the second region of the AR environment corresponding to the second FOV.

11. The method of claim 10, further comprising:

displaying, while the first region of the AR environment corresponding to the first FOV is provided through the display, an icon associated with the application on a portion of the first region of the AR environment corresponding to the first FOV, wherein, while the first region of the AR environment corresponding to the first FOV is provided through the display, the execution screen associated with the application is displayed at the first location in the AR environment, based on a second input being detected that is for the displayed icon.

12. The method of claim 10, wherein the first input is not related to the movement of the user associated with the FOV of the user.

13. The method of claim 10, wherein in case that the FOV of the user associated with movement of the user is unchanged and the first input for initiating the function to relocate the execution screen associated with the application is not received, while the second region of the AR environment corresponding to the second FOV is provided through the display, the execution screen associated with the application remains at the first location in the AR environment.

14. The method of claim 10, further comprising at least one of:

displaying at least one of a relative location or a relative direction for the first region of the AR environment corresponding to the first FOV; or displaying at least one of a relative location or a relative direction for the second region of the AR environment corresponding to the second FOV.

15. The method of claim 10, further comprising:

when the execution screen associated with the application is displayed at the first location in the AR environment while the first region of the AR environment corresponding to the first FOV is provided through the display, fixing the execution screen associated with the application at the first location in the AR environment, wherein, while the second region of the AR environment corresponding to the second FOV is provided through the display with the execution screen associated with the application remaining at the first location in the AR environment, the execution screen associated with the application remains fixed at the first location in the AR environment.

16. The method of claim 10, further comprising:

in case the second region of the AR environment corresponding to the second FOV includes the first location of the AR environment while the second region of the AR environment corresponding to the second FOV is provided through the display with the execution screen associated with the application remaining at the first location in the AR environment, displaying the execution screen associated with the application at a portion of the second region of the AR environment corresponding to the second FOV other than the central portion of the second region of the AR environment corresponding to the second FOV.

17. The method of claim 10, further comprising:

in case the second region of the AR environment corresponding to the second FOV does not include the first location of the AR environment while the second region of the AR environment corresponding to the second FOV is provided through the display with the execution screen associated with the application remaining at the first location in the AR environment, not displaying the execution screen associated with the application in the second region of the AR environment corresponding to the second FOV.

18. The method of claim 10, further comprising:

displaying a selectable AR element in the second region of the AR environment corresponding to the second FOV while the execution screen associated with the application is displayed in the second region of the AR environment corresponding to the second FOV; and discontinuing, based on a third input for the displayed selectable AR element being detected, the display of the execution screen associated with the application while continuing to provide the second region of the AR environment corresponding to the second FOV through the display.

19. One or more non-transitory computer-readable storage media storing one or more computer programs including computer-executable instructions that, when executed by at least one processor of an electronic device individually or collectively, cause the electronic device to perform operations, the operations comprising:

providing a first region of an augmented reality (AR) environment corresponding to a first field of view (FOV) of a user through a display of the electronic device;

displaying, while the first region of the AR environment corresponding to the first FOV is provided through the display, an execution screen associated with an application at a first location in the AR environment that corresponds to a central portion of the first region of the AR environment corresponding to the first FOV;

providing, in a state that a FOV of the user has changed from the first FOV to a second FOV of the user based on movement of the user associated with the FOV of the user, a second region of the AR environment corresponding to the second FOV through the display with the execution screen associated with the application remaining at the first location in the AR environment; and displaying, based on a first input that is a user selection to initiate a function to relocate the execution screen associated with the application detected while the execution screen is remained outside the second region of the AR environment corresponding to the second FOV, the execution screen associated with the application that is remained outside the second region of the AR environment corresponding to the second FOV at a second location in the AR environment that corresponds to a central portion of the second region of the AR environment corresponding to the second FOV.

20. The one or more non-transitory computer-readable storage media of claim 19, wherein in case that the FOV of the user associated with movement of the user is unchanged and the first input for initiating the function to relocate the execution screen associated with the application is not received, while the second region of the AR environment corresponding to the second FOV is provided through the display, the execution screen associated with the application remains at the first location in the AR environment.

* * * * *